United States Patent [19]

Sidorov et al.

[11] Patent Number: 4,495,401
[45] Date of Patent: Jan. 22, 1985

[54] TORCH FOR GAS-SHIELD ARC WELDING IN DEEP NARROW GROOVE

[75] Inventors: Viktor V. Sidorov; Efim Y. Tselniker; Evgeny P. Sidorov; Leonid V. Sukhov; Vyacheslav F. Gorb, all of Moscow; Gennady M. Bairakovsky, Kolpino Leningradskoi, all of U.S.S.R.

[73] Assignee: Nauchno-Proizvodstvennoe Obiedinenie Po Tekhnologii Mashinostroenia (NPO Tsniitmash), Moscow, U.S.S.R.

[21] Appl. No.: 403,506
[22] PCT Filed: Nov. 28, 1980
[86] PCT No.: PCT/SU80/00195
§ 371 Date: Jul. 12, 1982
§ 102(e) Date: Jul. 12, 1982
[87] PCT Pub. No.: WO82/01840
PCT Pub. Date: Jun. 10, 1982

[51] Int. Cl.³ .............................................. B23K 9/16
[52] U.S. Cl. ..................................... 219/136; 219/74; 219/137.2
[58] Field of Search ............. 219/136, 137 R, 130.21, 219/137.2, 137.42, 137.43, 137.61, 130.21, 74, 75, 124.02

[56] References Cited

U.S. PATENT DOCUMENTS 3,826,888  7/1974  Garfield et al. .................. 219/74

FOREIGN PATENT DOCUMENTS 55-100877  8/1980  Japan ................................... 219/74
322247  11/1970  U.S.S.R. .

Primary Examiner—Roy N. Envall, Jr.
Assistant Examiner—Catherine M. Sigda
Attorney, Agent, or Firm—Lilling & Greenspan

[57] ABSTRACT

A torch for gas-shielded arc welding in a deep narrow groove comprises a current contact torch bit (1) with an electrode (2) and a nozzle for supplying the shielding gas to the welding zone, which communicates with a gas-feeding tube (4) and is provided with at least one row of horizontally arranged holes (5). The nozzle is a closed chamber (3) made as a symmetrical wedge whose sharp edge faces the electrode (2) and is in one plane with the axis thereof. The side walls and bottom of the chamber (3) feature at least one additional row of holes (6) whose axes lie in one plane approximately perpendicular to the walls (7) of the groove.

The torch is designed primarily for welding of very thick workpieces.

2 Claims, 3 Drawing Figures

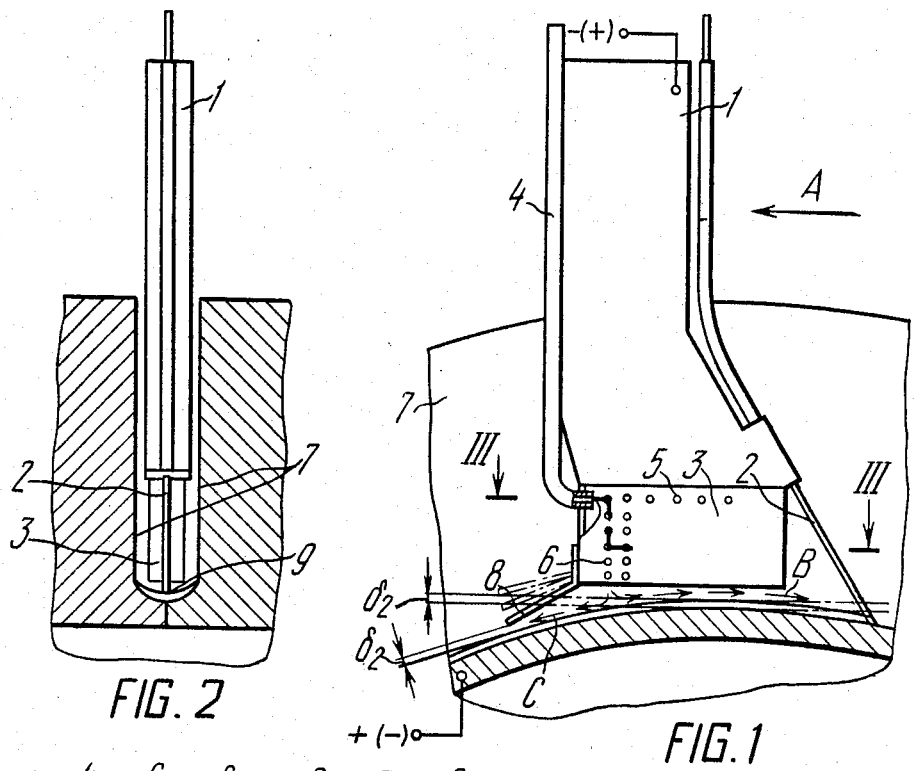
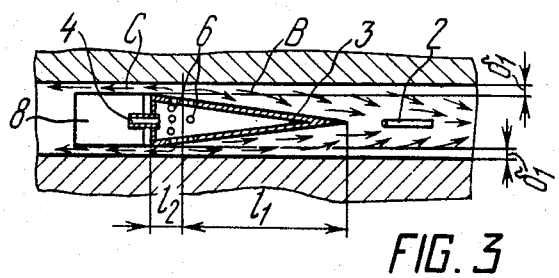
FIG. 2
FIG. 1
FIG. 3

4,495,401

TORCH FOR GAS-SHIELD ARC WELDING IN DEEP NARROW GROOVE

BACKGROUND OF THE INVENTION

1. Field of the Invention

This invention relates to electric welding and, more particularly, to a torch for gas-shielded arc welding in a narrow deep groove.

2. Background Art

Known in the art is a torch for gas-shielded arc welding in a narrow deep groove, comprising a current contact torch bit featuring an electrode set normally to the welded surface, and two nozzles, one nozzle being placed before and the other after the electrode as the latter travels in relation to the workpiece.

The torch bit, nozzles and groove walls produce an enclosed volume around the electrode, which is filled with shielding gas (cf., French Pat. No. 2,272,781, filed 1976). Such design of a torch provides for good gas shielding only when the electrode is set normally to the workpiece surface. If this torch uses a tilted electrode of an extended free length, the gas shield deteriorates substantially. Moreover, the known torch has its nozzles periodically blocked up by molten metal splatter.

Also known is a torch for gas-shielded arc welding, comprising a current contact torch bit with an electrode and an O-shaped nozzle having double walls, the space between said walls being communicated with a gas-feeding tube. The top portion of the outer nozzle wall features several horizontally arranged holes. The torch tip and the nozzle are introduced into the groove, the nozzle being positioned above the arc so that the axis of the nozzle and the axis of the tilted electrode intersect at the groove bottom. The arc is shielded by a flow of gas escaping from the nozzle. The gas flow is protected against injecting air intake by carbon dioxide fed from a hole at the top of the nozzle (cf., the USSR Inventor's Certificate No. 566,432, Aug. 13, 1975).

This torch is also insufficiently protected in the arc and weldpool zone because the flow section of the nozzle tends to grow smaller due to sticking of metal drippings. Clusters of splatter can also fall into the weldpool and cause weld defects, the welding process has, therefore, to be stopped periodically to clean the torch. Besides, the nozzle being positioned above the arc, the position of the electrode in the groove in relation to the edges is difficult to watch.

SUMMARY OF THE INVENTION

The object of the invention is to improve a torch for gas-shielded arc welding in a narrow deep groove so that the nozzle is not blocked up with splatter of molten metal and splashes do not fall into the weldpool, thus enhancing the quality of welding and the efficiency of the welding process.

The invention resides in a torch for gas-shielded arc welding in a narrow deep groove which comprises a current contact bit with an electrode and a nozzle for feeding shielding gas to the welding zone, which communicates with a gas-feeding tube and is provided with at least one row of horizontally arranged holes, according to the invention, the nozzle is made as an enclosed chamber shaped as a symmetrical wedge whose sharp edge faces the electrode and is located in one plane with the axis thereof, the side walls and bottom of the chamber having at least one additional row of holes whose axes lie in one plane approximately perpendicular to the walls of the groove.

In order to provide reliable gas shield of the weld zone for girth seams of various curvature it is advisable that the torch be equipped with a ledge secured externally on the chamber wall opposite the sharp edge, the inclination of the ledge in relation to the chamber bottom being variable.

A torch for arc welding in a narrow deep groove, made in accordance with the present invention provides for reliable gas shielding of the arc and weldpool from air, protection of the weldpool from metal splatter, reduction of the shielding gas consumption, observation of the electrode position in relation to the groove walls.

BRIEF DESCRIPTION OF DRAWINGS

The invention will now be described in more detail, by way of example, with reference to the accompanying drawings, in which:

FIG. 1 illustrates a general view of a torch for arc welding in a narrow deep groove;

FIG. 2 is a section along arrow A of FIG. 1;

FIG. 3 is a section along III—III as shown in FIG. 1.

DESCRIPTION OF THE PREFERRED EMBODIMENT

A torch for arc welding in a narrow deep groove comprises a bit 1 (FIGS. 1 and 2) whose top part contacts the current-carrying cooled plate of the welding head (not shown) and a tilted electrode 2 secured in the torch tip 1. An enclosed chamber 3 is secured to the lower portion of the torch tip 1. The chamber 3 is shaped like a wedge whose sharp edge faces the electrode 2 and lies in one plane with the axis thereof. The space of the chamber 3 communicates with a gas-feeding tube 4. A number of horizontally arranged holes 5 are made in the top portion of the chamber 3 in the side walls thereof. In addition, two rows of holes 6 are made in the side walls of the chamber 3 and in the bottom thereof. The axes of said holes 6 in each row lie in one plane approximately perpendicular to the groove walls 7. The holes 5 and 6 are intended to let out the shielding gas supplied through the tube 4 into the space of the chamber 3, which consists, for example, of a mixture of argon and carbon dioxide. The row of holes 5 is intended to cut the air off (external shielding of the welding zone), whereas the holes 6 are intended to keep the shielding medium in the arc zone. The holes 5 and 6 are located outside the splatter effective sticking zone. The boundary of area wherein the holes 6 (FIG. 3) are located is selected in accordance with the equation:

$$K l_1 (\tfrac{1}{2} l_2 tg\alpha + \delta_1)^3 = l_2 (\tfrac{1}{2} l_1 tg\alpha + \delta_1)^3$$

where $l_1$ is the distance from the sharp edge to the boundary of the hole row; $l_2$ is the difference between the total length of the chamber 3 and the distance $l_1$; $\alpha$ is the wedge angle; $\delta$ is the minimal clearance between the chamber 3 and the walls of the groove of the workpiece; and K is the coefficient equal to the ratio between the consumption of the shielding gas supplied to the welding arc and the consumption of gas for external protection and directed from the arc zone, which varies usually from 2 to 8.

The chamber 3 is secured on the tip 1 behind the electrode 2 as the latter travels in relation to the workpiece. Such arrangement precludes metal splatter and oxide from getting into the weldpool. In addition, it ensures easy observation of the welding process.

A ledge 8 is secured externally to the wall of the chamber 3 located opposite the sharp edge. The inclination of said ledge 8 can varied with respect to the bottom of the chamber 3, the purpose being to ensure permanent gas between the lower part of the torch and the bottom 9 of the groove in workpieces of different curvature.

A torch for arc welding in a narrow deep groove operates as follows.

The torch is introduced into the narrow groove so that the axis of the electrode coincides with the groove axis plane. The free length of the electrode 2 is adjusted so that the distance from the bottom of the chamber 3 to the bottom 9 of the groove is about 20 mm, and from the ledge 8 to the bottom 9 of the groove about 10 mm. A mixture is shielding gases is let into the chamber 3 through the tube 4, and the arc is struck to begin the welding process.

Jets of shielding gas emerge from the holes 5 and 6 strike against the walls 7 of the groove and form two streams B and C in opposite directions along the walls 7 of the groove.

The outer wedge-shaped walls of the chamber 3 and the walls 7 of the groove form a space whose resistance to the gas flow is less in the direction towards the electrode 2 and greater in the direction from the electrode 2.

In consequence, the bulk of the shielding gas (stream B is much larger than stream C) rushes into the arc zone to shield it, whereas a smaller amount (stream C) is directed from the arc, thus externally shielding the arc zone from air inflow. The streams B and C of the shielding gas are distributed in much the same manner when escaping from the holes 6 in the bottom of the chamber 3. In order to keep the stream C constant when welding workpieces of varying curvature, the clearance $\delta_2$ between the ledge 8 and the bottom 9 of the groove can be regulated by changing the inclination angle of the ledge 8 with respect to the bottom 9 of the chamber 3.

A torch for arc welding in a narrow and deep groove can be used for welding very thick workpieces.

We claim:

1. A torch for gas-shielded arc welding in a narrow deep groove, comprising a current contact torch bit; with an electrode and a nozzle for feeding the shielding gas to the welding zone, which communicates with a gas-feeding tube and is fitted with at least one row of horizontally arranged holes, characterized in that the nozzle is made as a closed chamber (3) which is wedge-shaped and whose sharp edge facing the electrode (2) is in one plane with the axis of the electrode (2), the side walls and bottom of the chamber (3) being provided with at least one additional row of holes (6) whose axes lie in one plane approximately perpendicular to the walls (7) of the groove; and a ledge (8) secured externally on a wall of the chamber (3) opposite the sharp edge thereof, the inclination angle of said ledge (8) being variable with respect to the bottom (9) of the chamber (3).

2. A torch for gas-shielded arc welding in a narrow deep groove, comprising a current contact torch bit; an electrode having an axis of symmetry extending through said torch bit; a nozzle for feeding the shielding gas to the welding zone; a gas-feeding tube communicating with said nozzle for feeding the shielding gas thereinto; said nozzle being made as a closed chamber and being symmetrically wedge-shaped to define side walls and a sharp edge formed at the point where said side walls meet, said chamber also having a bottom wall whose plane is normal to said side walls and a wall opposing said sharp edge, said chamber defining a plane of symmetry normal to the plane of said bottom wall and extending through said sharp edge, said sharp edge facing said electrode and extending along said axis thereof, said electrode axis being located in said plane of symmetry of said chamber, said chamber having at least one horizontal row of through holes in said side walls and at least one additional row of holes extending vertically in said side walls, the axes of said horizontally and vertically arranged holes which lie in one plane being approximately normal to said plane of symmetry of said chamber.

* * * * *